(12) United States Patent
Shogaki

(10) Patent No.: US 11,115,548 B2
(45) Date of Patent: Sep. 7, 2021

(54) IMAGE PROCESSING APPARATUS THAT EXECUTES JOB, CONTROL METHOD THEREFOR, AND STORAGE MEDIUM

(71) Applicant: CANON KABUSHIKI KAISHA, Tokyo (JP)

(72) Inventor: Yohei Shogaki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/429,370

(22) Filed: Jun. 3, 2019

(65) Prior Publication Data
US 2019/0379799 A1   Dec. 12, 2019

(30) Foreign Application Priority Data

Jun. 8, 2018 (JP) .............................. JP2018-110348

(51) Int. Cl.
*H04N 1/00* (2006.01)

(52) U.S. Cl.
CPC ..... *H04N 1/00506* (2013.01); *H04N 1/00389* (2013.01); *H04N 1/00411* (2013.01); *H04N 1/00474* (2013.01)

(58) Field of Classification Search
CPC ........... H04N 1/00506; H04N 1/00389; H04N 1/00411; H04N 1/00474
USPC .................. 358/1.15, 1.9, 448, 453
See application file for complete search history.

(56) References Cited

U.S. PATENT DOCUMENTS

| | | | |
|---|---|---|---|
| 9,936,088 B2 | 4/2018 | Yoshida | |
| 2009/0122342 A1* | 5/2009 | Kawano | H04N 1/00474 358/1.15 |
| 2010/0033748 A1 | 2/2010 | Enami | |
| 2010/0039664 A1 | 2/2010 | Funakawa | |
| 2010/0128309 A1 | 5/2010 | Matoba | |
| 2012/0243016 A1* | 9/2012 | Amano | H04N 1/00482 358/1.13 |
| 2015/0222770 A1 | 8/2015 | Yoshida | |

(Continued)

FOREIGN PATENT DOCUMENTS

| | | |
|---|---|---|
| JP | 2010201931 A | 9/2010 |
| JP | 2012203600 A | 10/2012 |

(Continued)

OTHER PUBLICATIONS

Extended European Search Report issued in European Appin. No. 19178040.2 dated Oct. 24, 2019.

(Continued)

*Primary Examiner* — Quang N Vo
(74) *Attorney, Agent, or Firm* — Rossi, Kimms & McDowell LLP

(57) ABSTRACT

An image processing apparatus which is capable of preventing the ease of operation for a user relating to history buttons from being decreased. In response to execution of a function selected by the user, a history button for calling job setting information used by the function is displayed on a display unit. Information related to the job setting information is displayed in a display area constituting the history button. A display size of the display unit is obtained, and the amount of information to be displayed in the display area constituting the history button is controlled based on the obtained display size of the display unit.

18 Claims, 4 Drawing Sheets

(56) References Cited

U.S. PATENT DOCUMENTS

2015/0261481 A1\* 9/2015 Takenaka ............. H04N 1/0035
                                                          358/1.15
2017/0075554 A1   3/2017 Sasayama
2018/0069973 A1\* 3/2018 O ....................... H04N 1/00779
2018/0278756 A1\* 9/2018 Shibukawa .......... H04N 1/0044

FOREIGN PATENT DOCUMENTS

JP    2015146503 A    8/2015
JP    2016144097 A    8/2016

OTHER PUBLICATIONS

Office Action issued in Japanese Appln. No. 2018-110348 dated Jan. 28, 2020.
Examination Report issued in Indian Appln. No. 201944022372 dated Jun. 1, 2021. English translation provided.

\* cited by examiner

IMAGE PROCESSING APPARATUS THAT EXECUTES JOB, CONTROL METHOD THEREFOR, AND STORAGE MEDIUM

BACKGROUND OF THE INVENTION

Field of the Invention

The present invention relates to an image processing apparatus, a control method therefor, and a storage medium.

Description of the Related Art

An MFP (multi-function peripheral) which is an image processing apparatus executing a job based on setting values configured on a job setting screen by a user is known. When the MFP has executed a job, it stores job setting information used for the job (see, for example, Japanese Laid-Open Patent Publication (Kokai) No. 2010-201931). The job setting information includes a plurality of setting values such as the number of copies and a color used for a print job executed by the MFP. The MFP also displays a plurality of history buttons, which is associated with respective pieces of the stored job setting information, on a display unit of the MFP (see, for example, Japanese Laid-Open Patent Publication (Kokai) No. 2015-146503). When the user selects one history button from among the plurality of history buttons, the MFP calls job setting information associated with the selected history button and displays a job setting screen, on which the called job setting information is set, on the display unit.

In a setting information display area that constitutes a history button, information on job setting information associated with the history button is displayed. By seeing the information displayed in the setting information display area, the user easily knows details of settings in the job setting information called when the user selected the history button.

However, if all information on job setting information is displayed in a setting information display area, the setting information display area would be enlarged, and by extension, a history button would be enlarged. The display unit has a limited display area, and hence a plurality of history buttons cannot be displayed at a time on the display unit, resulting in the ease of operation for the user being decreased.

SUMMARY OF THE INVENTION

The present invention provides an image processing apparatus and a control method therefor, which are capable of preventing the ease of operation for a user relating to history buttons from being decreased, as well as a storage medium.

Accordingly, the present invention provides an image processing apparatus that has a display unit, and in response to execution of a function selected by a user, displays on the display unit a history button for calling job setting information used by the function, comprising a display control unit configured to provide control to display information related to the job setting information in a display area constituting the history button, and an obtaining unit configured to obtain a display size of the display unit, wherein based on the display size of the display unit, the display control unit controls an amount of information to be displayed in the display area constituting the history button.

According to the present invention, the ease of operation for a user relating to history buttons is prevented from being decreased.

Further features of the present invention will become apparent from the following description of exemplary embodiments (with reference to the attached drawings).

DESCRIPTION OF THE EMBODIMENTS

An embodiment of the present invention will now be described in detail with reference to the drawings. It should be noted that in the following description of the present embodiment, the present invention is applied to an MFP which is an image processing apparatus, but the present invention should not always be applied to the MFP. For example, the present invention may be applied to apparatuses capable of displaying history buttons for calling setting information used before, and more specifically, image forming apparatuses such as a printing apparatus, a scanner, a fax, and a digital camera and information processing apparatuses such as a PC and a mobile information terminal.

Figure 1:
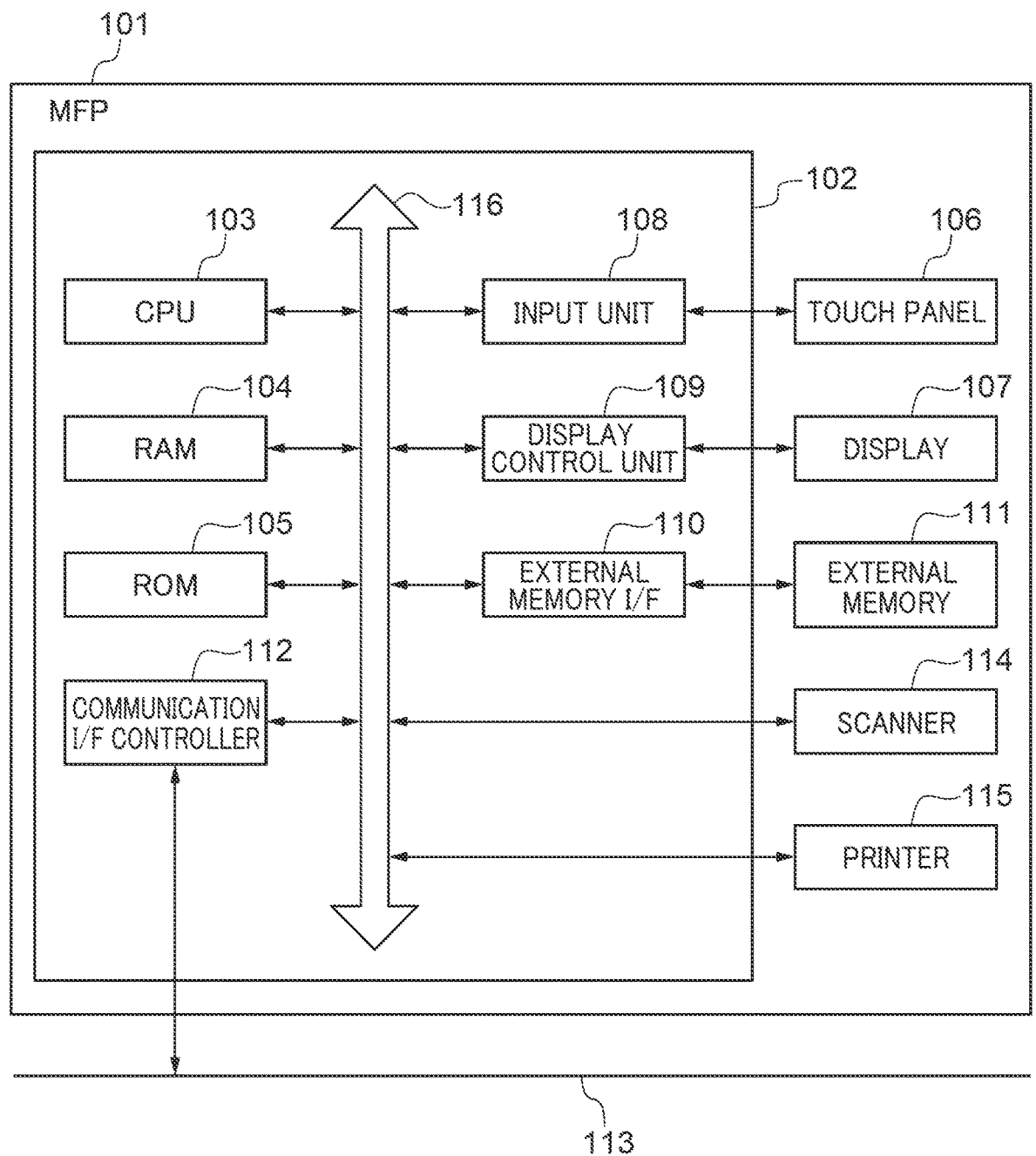
FIG. 1 is a block diagram schematically showing an arrangement of a communication system including an MFP which is an image processing apparatus according to an embodiment of the present invention.

FIG. 1 is a block diagram schematically showing an arrangement of the MFP 101 which is the image processing apparatus according to the embodiment of the present invention. Referring to FIG. 1, the MFP 101 has a control unit 102, a touch panel 106, a display 107, an external memory 111, a scanner 114, and a printer 115. The control unit 102 is connected to the touch panel 106, the display 107, the external memory 111, the scanner 114, and the printer 115. The control unit 102 also has a CPU 103, a RAM 104, a ROM 105, an input unit 108, a display control unit 109, an external memory I/F 110, and a communication I/F controller 112. The CPU 103, the RAM 104, the ROM 105, the input unit 108, the display control unit 109, the external memory I/F 110, and the communication I/F controller 112 are connected to one another via a system bus 116.

The MFP 101 has a plurality of applications for implementing functions such as a copying function, a scanning function, and a data transmission function. The MFP 101 starts the applications to execute jobs based on job setting information configured by a user. The MFP 101 also stores job setting information, which was used for jobs when the jobs were executed, as setting histories, to be described later. The control unit 102 integratedly controls the entire MFP 101. The CPU 103 provides various types of control by executing programs stored in, for example, the ROM 105 and the external memory 111. The RAM 104, which is a volatile memory, is used as a work area for the CPU 103 and also used as a temporary storage area for each piece of data. The ROM 105, which is a nonvolatile memory, stores image data, programs which are to be executed by the CPU 103, and so forth. In the following description, the RAM 104, the ROM 105, and the external memory 111 will be correctively referred to as a storage area.

The touch panel 106 and the display 107 function as an operating unit of the MFP 101. The touch panel 106 is configured integrally with the display 107 and attached to an upper layer of a display surface of the display 107. It should be noted that the touch panel 106 is transparent, and covering the display surface of the display 107 with the touch panel 106 never interferes with display on the display 107. Input coordinates on the touch panel 106 are associated with display coordinates on the display 107. Based on a user operation on the touch panel 106, the input unit 108 outputs a control signal corresponding to the user operation to the CPU 103. The CPU 103 controls the constituent elements of the MFP 101 based on the received control signal. Thus, the MFP 101 is able to implement an action according to the user operation. The display control unit 109 outputs a display signal, which is for displaying an image, to the display 107 based on display control signals received from the CPU 103. Based on a display signal received from the display control unit 109, the display 107 displays, for example, a home screen 200 in FIG. 2A, to be described later.

The external memory 111 such as a hard disk, an SSD, a CD, a DVD, or a memory card 111 can be mounted on the external memory I/F 110. The external memory I/F 110, which is controlled by the CPU 103, for example, reads data from and writes data into the mounted external memory 111. The communication I/F controller 112, which is controlled by the CPU 103, carries out data communications with an external apparatus which is connected thereto via a network 113 such as the Internet, a wired LAN, or a wireless LAN. The scanner 114 reads an original placed thereon and generates image data based on information that has been read. The printer 115 prints image data, which is generated by the scanner 114, or the like on sheets.

Figure 2A:
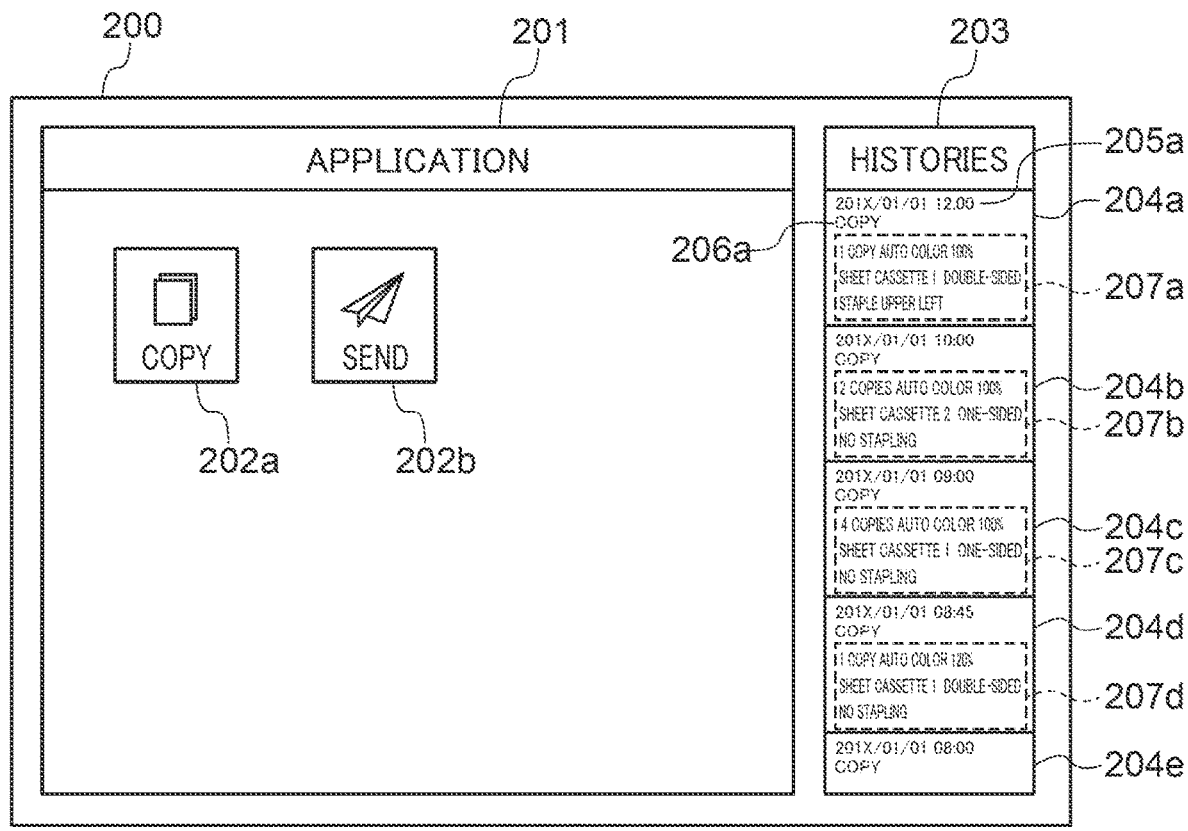
FIGS. 2A and 2B are views showing an example of a home screen which is displayed on a display in FIG. 1.
Figure 2B:
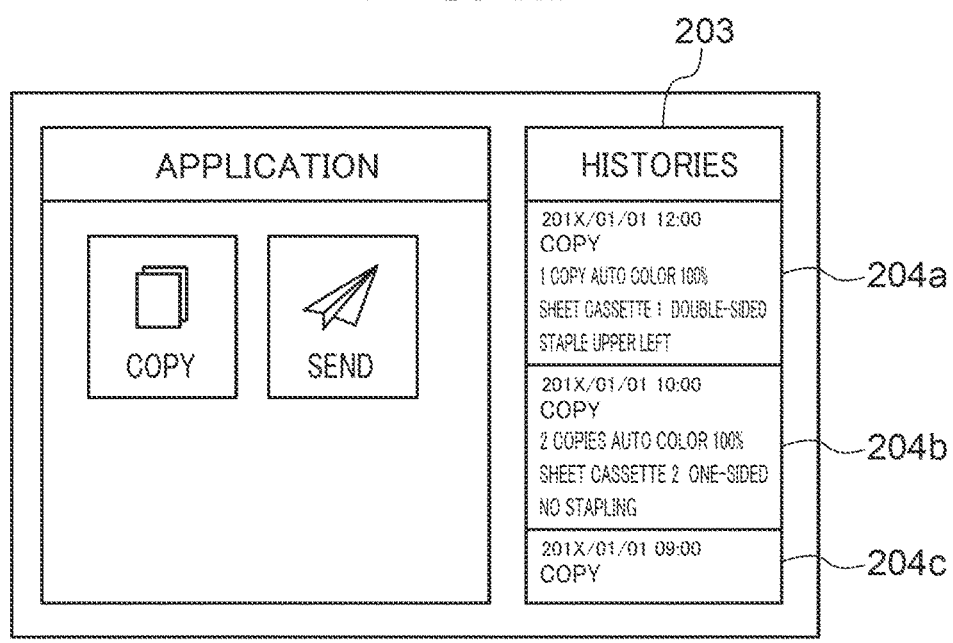

FIGS. 2A and 2B are views showing examples of the home screen 200 which is displayed on the display 107 in FIG. 1. The home screen 200 is comprised of an application display area 201 and a history display area 203 as shown in FIG. 2A.

Application buttons 202a and 202b corresponding to respective applications incorporated in the MFP 101 are displayed in the application display area 201. The application buttons 202a and 202b are buttons for starting the corresponding applications. For example, when the user selects the application button 202a on the home screen 200, the MFP 101 starts a copy application corresponding to the application button 202a.

A plurality of history buttons 204a to 204e is displayed in the history display area 203. It should be noted that in the present embodiment, the history buttons 204a to 204e have the same arrangement, which will be described below using the history button 204a as an example. The history button 204a is a button for calling job setting information used for a job executed before. When the MFP 101 has executed a job, it stores a setting history for the job in the storage area. The setting history includes application information indicating a type of an application that executed the job, job setting information used for the job, and information on a date and time at which the job was executed. The MFP 101 generates a history button associated with the stored setting history and displays the generated history button at the top of the history display area 203. Thus, in the present embodiment, dates and times at which job were executed are displayed in order from the newest one in the history display area 203.

The history button 204a is comprised of a date information display area 205a, an application information display area 206a, and a setting detail display area 207a. In the date information display area 205a, date and time information included in a setting history associated with the history button 204a is displayed. In the application information display area 206a, application information included in a setting history associated with the history button 204a is displayed. For example, when a setting history associated with the history button 204a is a setting history relating to a copy job, "Copy" which represents the copy application is displayed in the application information display area 206a.

In the setting detail display area 207a, information related to job setting information included in a setting history associated with the history button 204a is displayed. For example, setting values of multiple setting items such as settings as to the number of copies, color, zoom rate, sheet-feeding cassette, double-sided printing, and stapling included in job setting information are displayed in the setting detail display area 207a. The size of the history button 204a is determined so that all information displayed in the date information display area 205a, the application information display area 206a, and the setting detail display area 207a can be fitted inside the history button 204a. In the present embodiment, the amount of information displayed in the setting detail display area 207a is larger than that of information displayed in the date information display area 205a and the application information display area 206a. For this reason, the amount of information displayed in the setting detail display area 207a in particular has a greater influence on determination as to the size of the history button 204a than the date information display area 205a and the application information display area 206a. For example, when a large amount of information is to be displayed in the setting detail display area 207a, the history button 204a becomes large along a direction in which the history buttons 204a to 204d are arranged. On the other hand, when a small amount of information is to be displayed in the setting detail display area 207a, the history button 204a becomes small to such an extent that it is viewable by the user along the direction in which the history button 204a to 204d are arranged.

When a history button cannot fit into the history display area 203, only a part of the history button is displayed in the history display area 203 like, for example, the history button 204e. Upon receiving a flick operation upward in a vertical direction of the home screen 200 from the user, the MFP 101 displays the history buttons in a scrolling manner. By displaying the history buttons in a scrolling manner, the MFP 101 displays the whole of the history button 204e, only a part of which has been displayed, and also displays the other history buttons, which have not been displayed in the history display area 203, in the history display area 203.

When, for example, the user selects the history button 204a on the home screen 200, the MFP 101 reads out job setting information and application information corresponding to the history button 204a. Then, the MFP 101 sends the job setting information to an application that matches the application information that has been read out. The application that has received the job setting information reads out setting values from the job setting information and displays a setting screen for the application with the read-out setting values set on the setting screen. Thus, the user easily calls setting values that has been configured once.

The MFP 101 is also able to send stored setting histories to other MFPs and cause these MFPs to display history buttons, which are associated with the setting history, on their displays. On this occasion, by matching display settings such as a character size, the home screen 200 including the same setting history buttons can be displayed on the display of each MFP, and the user can use each MFP with the same ease of operation.

The display 107 has a limited display area, and hence if display of the history buttons is not controlled suitably for a display size of the display 107, the ease of operation for the user relating to the history buttons may decrease. For example, if all information related to job setting information is displayed in the setting detail display area 207a although the display size of the display 107 is relatively small, the history button 204a would be enlarged. In this case, the number of history buttons displayed at a time on the display 107 would decrease as shown in FIG. 2B, resulting in the ease of operation for the user being decreased.

To address this problem, in the present embodiment, the amount of information to be displayed in the setting detail display areas 207a to 207d of the history buttons 204a to 204d is controlled based on the display size of the display 107.

Figure 3:
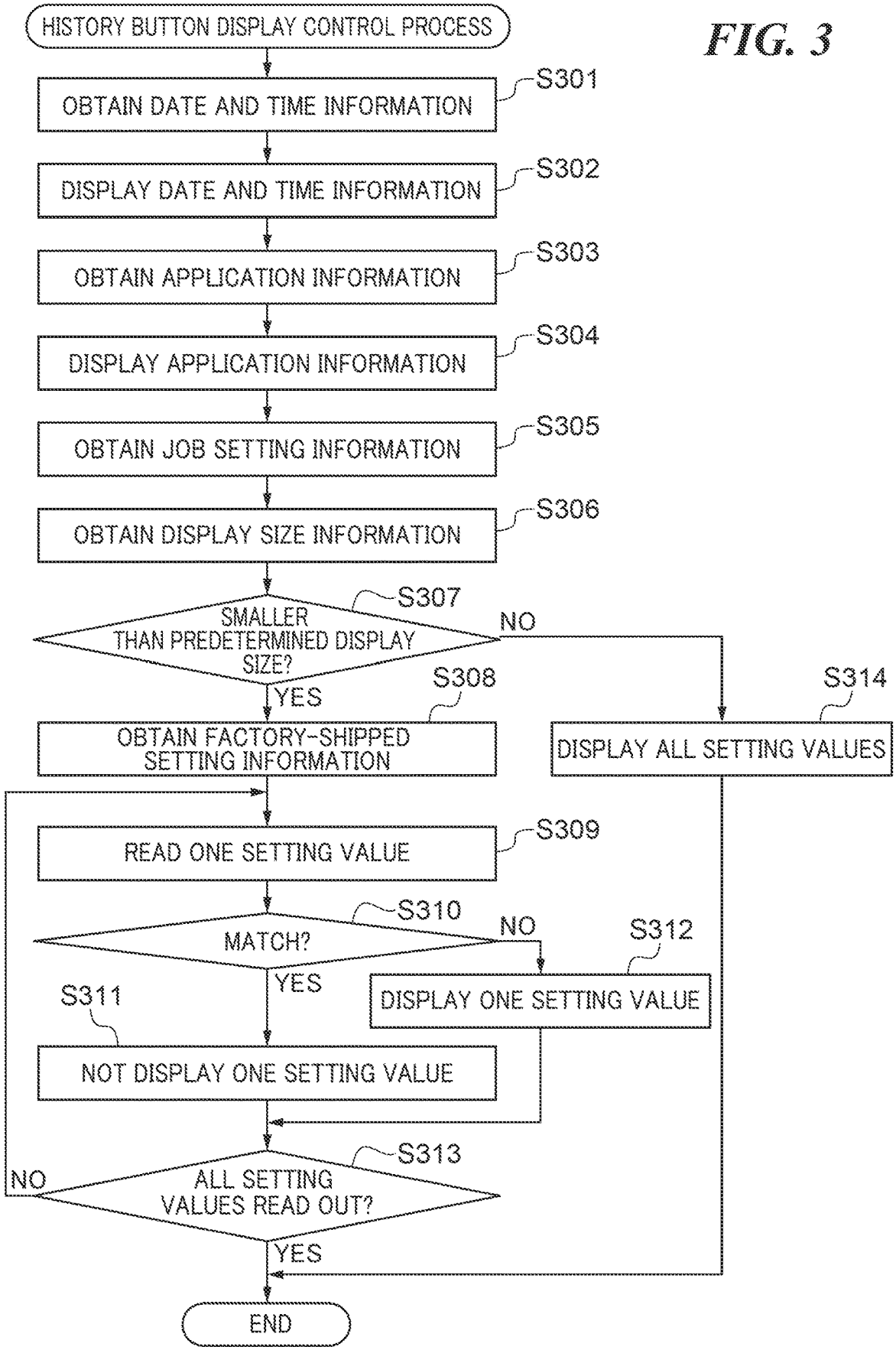
FIG. 3 is a flowchart showing the procedure of a history button display control process which is carried out by the MFP in FIG. 1.

FIG. 3 is a flowchart showing the procedure of a history button display control process which is carried out by the MFP 101 in FIG. 1. The process in FIG. 3 is implemented by the CPU 103 executing a program stored in the storage area. The process in FIG. 3 is also carried out when the setting history described above is stored in the storage area. In the process described below, for example, the history button 204a associated with the stored setting history is displayed in the history display area 203.

Referring to FIG. 3, first, the CPU 103 obtains date and time information from the stored setting history (step S301). Next, the CPU 103 displays the obtained date and time information in the date information display area 205a of the history button 204a (step S302). Then, the CPU 103 obtains application information from the stored setting history (step S303). After that, the CPU 103 displays the obtained application information in the application information display area 206a of the history button 204a (step S304). The CPU 103 subsequently obtains job setting information from the stored setting history (step S305). The CPU 103 then obtains display size information on the display 107, which is stored in advance in the storage area (step S306). The CPU 103 obtains, for example, a diagonal size of the display 107 as the display size information. After that, based on the obtained display size information, the CPU 103 determines whether or not the display size of the display 107 is smaller than a predetermined display size (step S307). In the step S307, when, for example, the diagonal size is equal to or greater than 10 inches, the CPU 103 determines that the display size of the display 107 is equal to or greater than the predetermined display size. On the other hand, when the diagonal size is smaller than 10 inches, the CPU 103 determines that the display size of the display 107 is smaller than the predetermined display size.

As a result of the determination in the step S307, when the display size of the display 107 is smaller than the predetermined display size, the CPU 103 obtains factory-shipped setting information stored in the storage area in advance (step S308). The factory-shipped setting information includes a plurality of factory-shipped values registered at the time of factory shipment. The factory-shipped values are values that cannot be changed by the user. The factory-shipped values are used as initial values of job setting information and also used to reset a setting state of the MFP 101. On the other hand, in the MFP 101, initial values of job setting information can be registered as default setting values on a user-by-user basis without using the factory-shipped values. When an application for which a default setting value is set is started, the CPU 103 displays a setting screen for this application on the display 107 with the default setting values set on the setting screen.

Then, the CPU 103 reads out one setting value from the plurality of setting values included in the job setting information (step S309). After that, the CPU 103 identifies a factory shipped value of a setting item corresponding to the setting value, which was read out in the step S309, from the obtained factory-shipped setting information. The CPU 103 determines whether or not the setting value read out in the step S309 matches the identified factory-shipped value (step S310). Here, when the setting value read out in the step S309 does not match the identified factory-shipped value, it is determined that the setting value is a setting value of a setting item which was changed from an initial value when the user issued an instruction to execute the job. On the other hand, when the setting value read out in the step S309 matches the identified factory-shipped value, it is determined that the setting value is a setting value of setting item which was not changed from an initial value when the user issued an instruction to execute the job, that is, an initial value.

As a result of the determination in the step S310, when the setting value read out in the step S309 matches the identified factory-shipped value, the CPU 103 does not display the setting value in the setting detail display area 207a of the history button 204a (step S311). Then, the CPU 103 carries out a process in step S313, to be described later.

Figure 4:
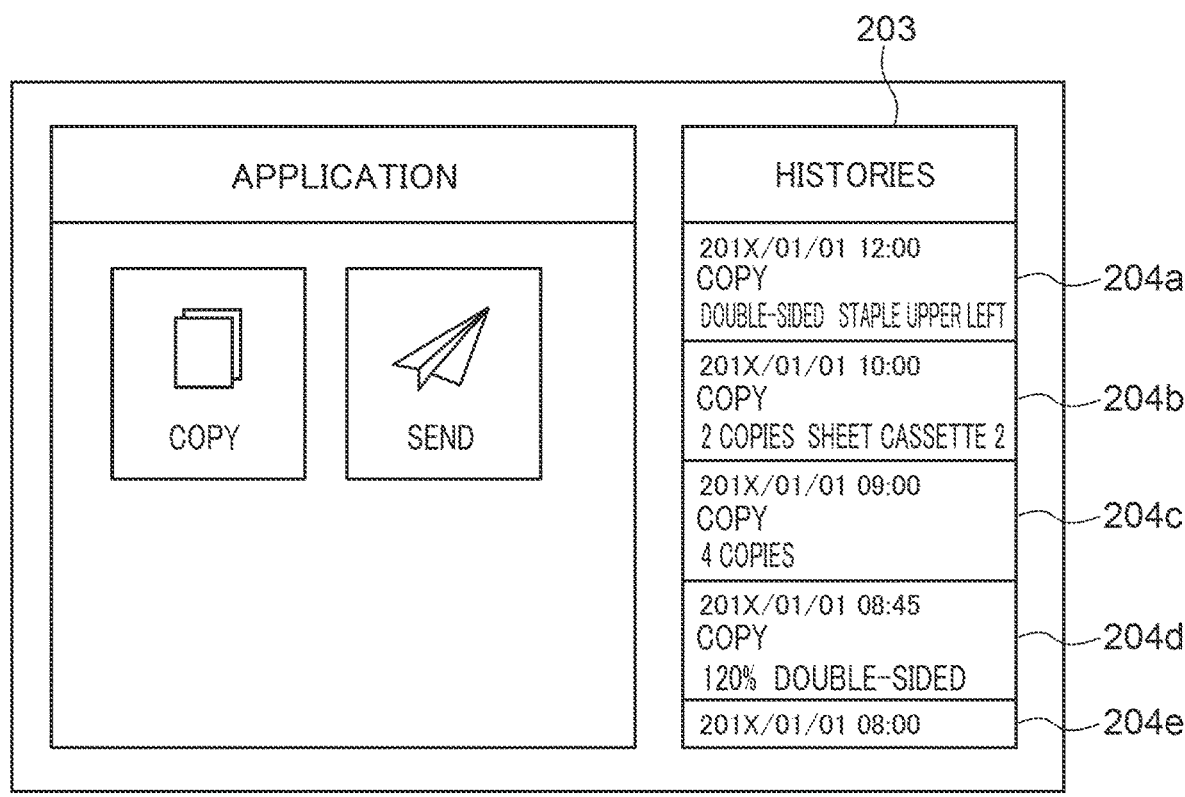
FIG. 4 is a view showing an example of a home screen which is displayed on the display in FIG. 1.

As a result of the determination in the step S310, when the setting value read out in the step S309 does not match the identified factory-shipped value, the CPU 103 displays the setting value in the setting detail display area 207a of the history button 204a (step S312). Thus, in the present embodiment, when the display size of the display 107 is smaller than the predetermined display size, the CPU 103 provides control to reduce the amount of information in the setting detail display area 207a. In this case, the same control is provided for the setting detail display areas 207b to 207d as well, and the history buttons 204a to 204d are displayed in the history display area 203 in a manner being fitted into it as shown in FIG. 4. Then, the CPU 103 determines whether or not all the setting values included in the job setting information have been read out (step S313).

When the CPU 103 determines in the step S313 that all the setting values included in the job setting information have not been read out, the process returns to the step S309. When the CPU 103 determines in the step S313 that all the setting values included in the job setting information have been read out, the CPU 103 ends the present process.

As a result of the determination in the step S307, when the display size of the display 107 is equal to or greater than the predetermined display size, the CPU 103 displays all the setting values, which are included in the obtained job setting information, in the setting detail display area 207a of the history button 204a (step S314). After that, the CPU 103 ends the present process.

According to the embodiment described above, the amount of information to be displayed in the setting detail display areas 207a to 207d of the history buttons 204a to 204d is controlled based on the display size of the display 107. Namely, information in an amount unsuitable for the display size of the display 107 is prevented from being displayed in the setting detail display area 207a or the like. It is thus possible to avoid a situation in which the history buttons 204a to 204d cannot be displayed at a time on the display 107 and thus prevent the ease of operation for the user relating to the history buttons 204a to 204d from being decreased.

Moreover, in the embodiment described above, when the display size of the display 107 is smaller than the predetermined display size, information on some setting values included in job setting information is displayed in the setting detail display areas 207a to 207d. Namely, when the display size of the display 107 is smaller than the predetermined display size, control is provided to reduce the amount of information to be displayed in the setting detail display areas 207a to 207d so that the history buttons 204a to 204d can fit on the display 107. As a result, even when the display size of the display 107 is smaller than the predetermined display size, the history buttons 204a to 204d can be displayed at a time.

Furthermore, in the embodiment described above, when the display size of the display 107 is smaller than the predetermined display size, information on setting values that do not match initial values among a plurality of setting values included in job setting information is displayed in the setting detail display areas 207a to 207d. Setting values that do not match initial values are very likely to be setting values that were set on purpose by the user when he or she issued an instruction to execute a job, and hence the user pay much attention to those setting values. For this reason, only by seeing setting values that do not match initial values among a plurality of setting values included in job setting information, the user can grasp details of the job setting information to some extent. From the standpoint of letting the user know details of job setting information, it is preferred that information on setting values that do not match initial values is displayed in the history buttons 204a to 204d. Accordingly, in the present embodiment, when the display size of the display 107 is smaller than the predetermined display size, information on setting values that do not match initial values among a plurality of setting values included in job setting information is displayed in the setting detail display areas 207a to 207d. As a result, even when the amount of information to be displayed in the setting detail display areas 207a to 207d of the history buttons 204a to 204d is reduced so that the history buttons 204a to 204d can fit on the display 107, the user is informed about details of job setting information associated with the history buttons 204a to 204d.

In the embodiment described above, when the display size of the display 107 is equal to or greater than the predetermined display size, information on all the setting values included in job setting information is displayed in the setting detail display areas 207a to 207d. This informs the user about full details of job setting information associated with the history buttons 204a to 204d and thus provides the user with an environment in which he or she can easily select a desired history button.

It should be noted that the determination in the step S307 may be made based on resolution information indicating a resolution of the display 107 obtained as display size information. For example, when the resolution of the display 107 indicated by the obtained resolution information is VGA, the CPU 103 determines that the display size of the display 107 is smaller than the predetermined display size. On the other hand, when the resolution of the display 107 indicated by the obtained resolution information is SVGA, the CPU 103 determines that the display size of the display 107 is equal to or greater than the predetermined display size.

Moreover, in the embodiment described above, the determination in the step S307 may be made based on information that is a combination of a resolution and the number of pixels.

Furthermore, in the embodiment described above, the determination in the step S307 may be made based on identification information and display size mapping information on the display 107 which are stored in advance in the storage area. When the MFP 101 supports only one display size, display size information that is a fixed value is stored in the storage area. On the other hand, when the MFP 101 supports a plurality of display sizes, identification information on the display 107 installed in the MFP 101 is stored in the storage area. The identification information is, for example, model number information on the display 107. The CPU 103 reads out the model number information on the display 107, identifies a display size of the display 107 based on the model information and the display size mapping information, and makes the determination in the step S307 based on the identified display size.

In the embodiment described above, information on the display 107 connected to the MFP 101 may be received using the touch panel 106 or the like.

Moreover, in the embodiment described above, display control for the history buttons may be provided by the CPU 103 executing a display control program that is not created exclusively for the display 107. It should be noted that the display control program is stored in the storage area. Here, from the standpoint of making a manufacturing process for an MFP more efficient, incorporating a universal display control program, which is not created exclusively for any particular MFP, into a plurality of MFPs equipped with displays of different display sizes is under consideration. In each of MFPs produced in such a manufacturing process, display of history buttons may not be controlled suitably for a display size of a display. For example, in an MFP equipped with a display of a relatively small display size, only a small number of history buttons can be displayed at a time on the display (see, for example, FIG. 2B), resulting in the ease of operation for users relating to the history buttons being decreased. The same effects as those in the embodiment described above are obtained by carrying out the process in FIG. 3 described above for each of MFPs produced in such a manufacturing process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-110348, filed Jun. 8, 2018, which is hereby incorporated by reference herein in its entirety.

What is claimed is:

1. An image processing apparatus operable with an user interface including a display, and displays on the display a history button for calling a job setting used by a function, the image processing apparatus comprising:
    a display control unit configured to display information indicating at least part of a setting of a job executed using one function in a display area constituting the history button; and
    an obtaining unit configured to obtain a display size of the display by communicating with the display included with the user interface connected to the image processing apparatus,
    wherein the display control unit determines the number of setting items to be displayed in the display area as the information, based on the obtained display size.

2. The image processing apparatus according to claim 1, further comprising:
    a determination unit configured to determine whether or not setting values included in the job setting match initial values that are initial values of setting items corresponding to the setting values and registered at the time of factory shipment of the image processing apparatus,
    wherein when the display size of the display is smaller than a predetermined display size, the display control unit displays, in the display area, information on the setting values that do not match the initial values among the plurality of setting values included in the job setting.

3. The image processing apparatus according to claim 2, wherein when the display size of the display is equal to or greater than the predetermined display size, the display control unit displays, in the display area, information on all of the setting values included in the job setting.

4. The image processing apparatus according to claim 1, wherein the display control unit controls display based on a display control program that is not created exclusively for the user interface.

5. The image processing apparatus according to claim 1, wherein:
    a plurality of history buttons each are associated with one of a plurality of functions included in the image processing apparatus, and
    the number of the history buttons displayed by the display control unit, in a case where the obtained display size is a first size, is same as the number of the history buttons displayed by the display control unit in a case where the obtained display size is a second size, which is larger than the first size.

6. The image processing apparatus according to claim 1, wherein:
    a plurality of history buttons each are associated with one of a plurality of functions included in the image processing apparatus, and
    when one of the history buttons is selected, the setting corresponding to the selected history button is called and a new job is executed based on the called setting.

7. The image processing apparatus according to claim 1, wherein the display control unit determines the number of setting items to be displayed in the display area, to control a size of the display area.

8. The image processing apparatus according to claim 1, wherein the display control unit determines the number of setting items to be displayed in the display area, so that the display area becomes smaller as the obtained panel size becomes smaller.

9. The image processing apparatus according to claim 1, wherein the smaller the obtained display size, the fewer the number of setting items.

10. The image processing apparatus according to claim 1, wherein the history button is displayed in accordance with execution of the job using the one function.

11. The image processing apparatus according to claim 1, wherein the job is a print job or a copy job.

12. The image processing apparatus according to claim 1, wherein the display size is a length of a display.

13. The image processing apparatus according to claim 1, wherein the setting items include at least a setting as to the number of copies or a setting as to color.

14. The image processing apparatus according to claim 1, wherein respective setting values corresponding to the setting items are displayed in the display area.

15. The image processing apparatus according to claim 1, wherein the display control unit changes the number of setting items to be displayed in the display area, based on the obtained display size.

16. The image processing apparatus according to claim 1, wherein the number of setting items to be displayed, which is determined by the display control unit based on the obtained display size is variable.

17. A control method for an image processing apparatus operable with a user interface including a display, and displays on the display a history button for calling a job setting used by a function, the method comprising:
    a display control step of displaying information indicating at least part of a setting of a job executed using one function in a display area constituting the history button; and
    an obtaining step of obtaining a display size of the display by communicating with the display included in the user interface connected to the image processing apparatus,
    wherein the display control step determines the number of setting items to be displayed in the display area as the information, based on the obtained display size.

18. A non-transitory computer-readable storage medium storing a program executable by a computer to execute a control method for an image processing apparatus operable with a user interface including a display, and displays on the display a history button for calling a job setting used by a function, the control method comprising:

a display control step of displaying information indicating at least part of a setting of a job executed using one function in a display area constituting the history button; and an obtaining step of obtaining a display size of the display by communicating with the display included in the user interface connected to the image processing apparatus, wherein the display control step determines the number of setting items to be displayed in the display area as the information, based on the obtained display size.

* * * * *